United States Patent
Palfer-Sollier

(10) Patent No.: US 9,645,927 B2
(45) Date of Patent: May 9, 2017

(54) REDUCTION OF EVICTIONS IN CACHE MEMORY MANAGEMENT DIRECTORIES

(71) Applicant: BULL SAS, Les Clayes-sous-Bois (FR)

(72) Inventor: Thibaut Palfer-Sollier, Montrouge (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 14/744,139

(22) Filed: Jun. 19, 2015

(65) Prior Publication Data

US 2015/0370709 A1   Dec. 24, 2015

(51) Int. Cl.
*G06F 12/00*     (2006.01)
*G06F 12/0817*   (2016.01)
*G06F 12/0842*   (2016.01)

(52) U.S. Cl.
CPC ........ *G06F 12/0824* (2013.01); *G06F 12/082* (2013.01); *G06F 12/0842* (2013.01); *G06F 2212/603* (2013.01); *G06F 2212/622* (2013.01)

(58) Field of Classification Search
CPC .. G06F 12/00; G06F 12/0824; G06F 12/0842; G06F 2212/622; G06F 2212/603
USPC ................. 711/100, 117, 118, 141, 154, 200
See application file for complete search history.

(56) References Cited

U.S. PATENT DOCUMENTS

| | | | | |
|---|---|---|---|---|
| 6,085,295 | A * | 7/2000 | Ekanadham | ........ G06F 12/0813 709/214 |
| 7,003,630 | B1 | 2/2006 | Kissell | |
| 2006/0176886 | A1 * | 8/2006 | Goodman | ........... G06F 12/0813 370/401 |
| 2012/0079214 | A1 | 3/2012 | Moga et al. | |
| 2014/0082297 | A1 | 3/2014 | Solihin | |

FOREIGN PATENT DOCUMENTS

EP    2 088 511 A1    8/2009

OTHER PUBLICATIONS

Preliminary Search Report as issued in French Patent Application No. 1455746, dated May 28, 2015.

* cited by examiner

*Primary Examiner* — Tuan Thai
(74) *Attorney, Agent, or Firm* — Pillsbury Winthrop Shaw Pittman LLP

(57) ABSTRACT

A module of cache coherence management by directory, in which each datum stored in cache memory is associated with a state, at least one of which indicates data sharing among a plurality of processors, the module including a storage unit to store a directory containing a list of cache memory addresses, each address possibly associated with a state corresponding to the state of the datum available at this address, and a processing unit configured to update said list, said processing unit being configured so as not to list the address lines related to data associated with the first state.

10 Claims, 3 Drawing Sheets

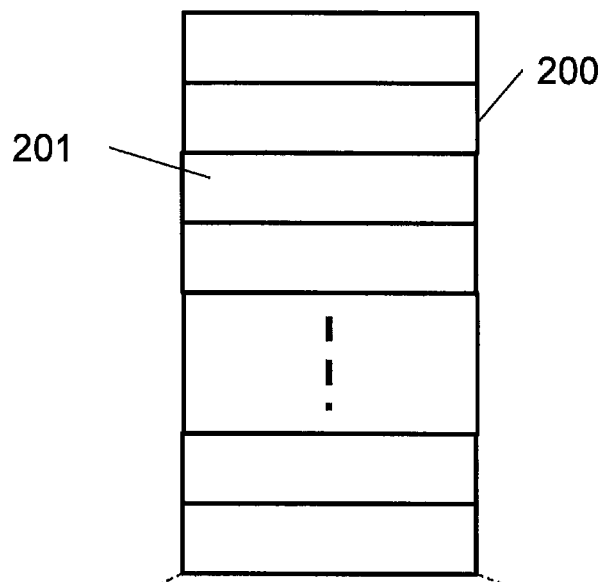
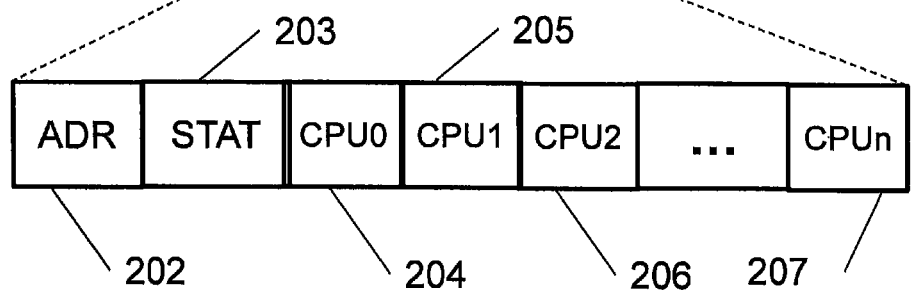
Fig. 2
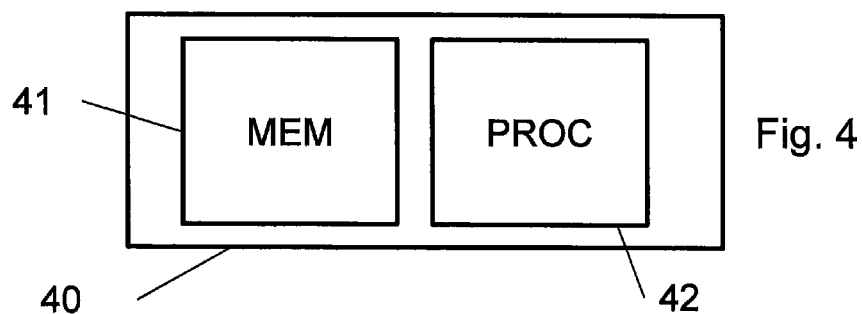
Fig. 4

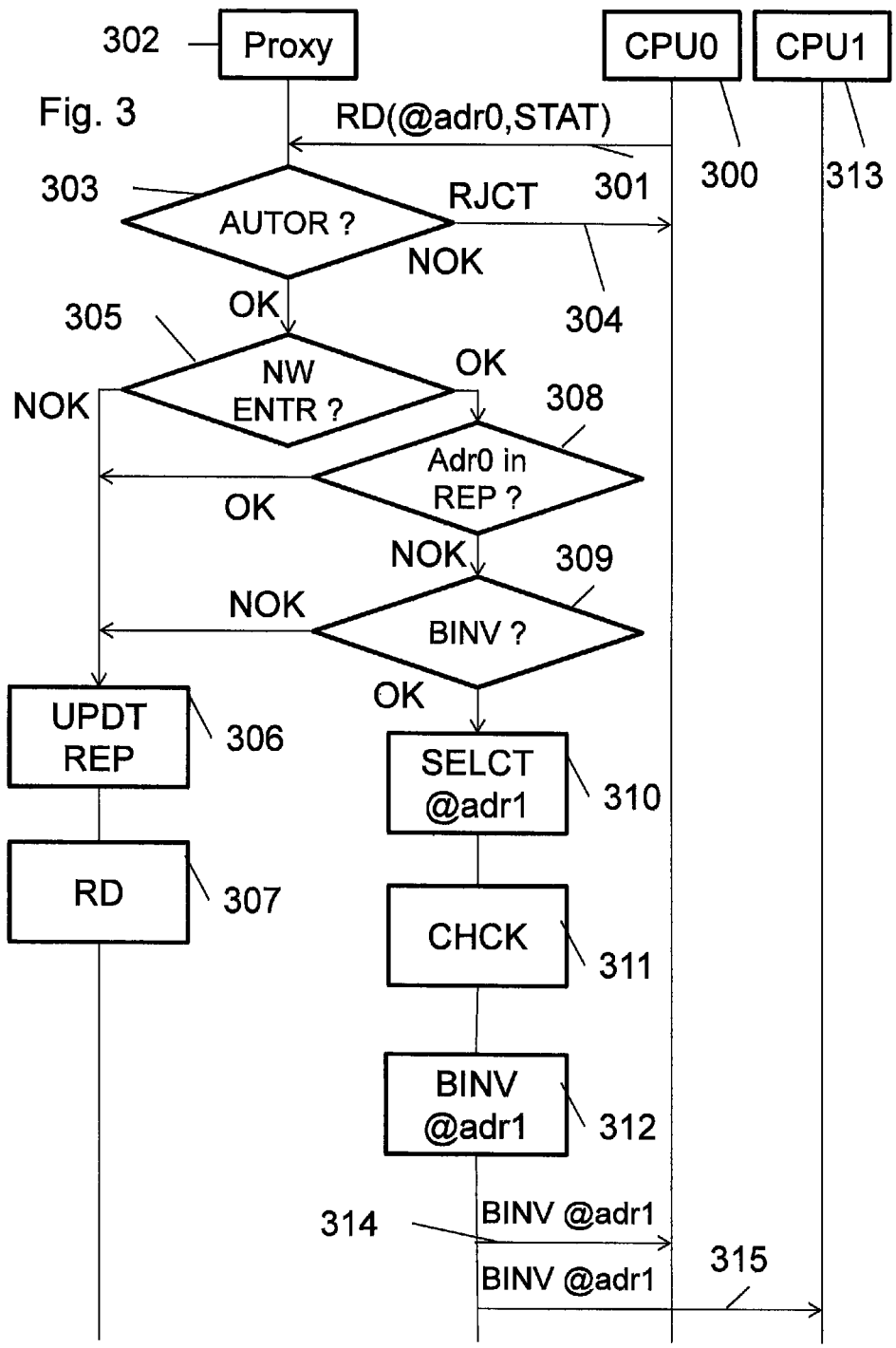

REDUCTION OF EVICTIONS IN CACHE MEMORY MANAGEMENT DIRECTORIES

CROSS-REFERENCE TO RELATED APPLICATIONS

This application claims priority to French Application No. 1455746, filed Jun. 20, 2014, the content of which is incorporated herein by reference in its entirety.

FIELD

The present invention relates to cache memory management in multiprocessor computer systems.

BACKGROUND

In such systems, each processor has its own cache memory to store calculation data, such as memory addresses pointing to instructions to execute. Since the processors operate in parallel, they share some of these data. Thus, several processors may have read or write access to the same datum in order to possibly modify it and thus execute a computer program.

To ensure that the data used by the processors are updated, and prevent two processors from processing two different versions of the same datum, "cache coherence" algorithms are implemented. The MESI algorithm is an example of one such algorithm.

The implementation of cache coherence algorithms necessitates a large number of communications among the processors so that they can know the location of a datum at all times. It is a matter of determining the identification of the cache memory in which the datum is found, as well as its state.

The state of a datum in cache memory depends on the protocol used. In the example of the aforementioned MESI protocol, a datum is in "Modified" (M) state if the datum is present in only one cache memory and this datum has been modified in relation to the datum present in non-cache memory (from which the initial datum comes). In this case, a processor that wants to access the datum may, for example, wait until the datum is made consistent with the version in memory. Certain cache coherence protocols, however, may permit modified data to be transferred directly from cache to cache.

In the same example again, a datum is in the "Exclusive" (E) state if it is present in only one cache memory and if this datum indeed corresponds to the version in non-cache memory. A datum is in the "Shared" (S) state if it is present in several cache memories. Finally, a datum is in the "Invalid" (I) state if it is not up to date. It must then be ignored by the processors and not be used.

There are other protocols with more or fewer defined states. For example, the MSI protocol includes only the three states M, S and I defined above, while the MOESI protocol adds an "Owned" (O) state, equivalent to the "S" state but where the memory is not up to date.

Most cache coherence protocols use lists, or directories, indicating the history of requests made on each datum. This is called a "directory-based" protocol.

Each processor maintains a list which, for each cache line, indicates the processors in which is stored the datum recorded there, as well as its state. The information contained by this list may be more or less complete.

By using this list, a history of the requests from the processors concerning a datum can be kept with the processors. In particular, this permits filtering cache queries, while preventing, for example, querying the cache of a processor which has not manipulated a datum. In addition, if a datum does not appear in the processors' lists, it may be deduced that the datum is not in the process of being used by a processor and that it is thus stored in memory (non-cache) and is up to date.

FIG. 1 schematically illustrates a multiprocessor system.

The system includes four modules 100, 110, 120, 130. Each module includes a plurality of processors. Module 100 includes two processors 101 and 102. Module 110 includes two processors 111 and 112. Module 120 includes two processors 121 and 122. Module 130 includes two processors 131 and 132. Each processor has a respective cache memory. These cache memories are not represented.

The number of modules in the system and the number of processors in the modules are provided for illustrative purposes only. The modules may contain different numbers of processors.

In order to manage communications among the different processors, including to manage cache coherence, each module 100, 110, 120, 130 has a respective proxy module 103, 113, 123, 133. In the interest of clarity, the interconnections among the proxy modules are not represented.

Thus, each processor has a unique interface to communicate with the other processors. All of this happens as though each processor were addressing only one other processor at a time. In particular, the proxy modules maintain directories for the processors of their respective modules. The proxy modules may also maintain a directory for processors other than their respective modules.

The use of proxy modules proves desirable when the system has a large number of processors.

However, the directories maintained by the proxy modules are not identical to those which may be maintained by the processors. In fact, whenever a certain number of processors is present in a module, the size of the directory becomes too large. Notably, the space of the proxy module on the silicon would become a problem.

The proxy modules thus maintain a particular type of directory described as "inclusive." This involves maintaining a list containing only the addresses pointing to a valid datum, i.e., in the example of the MESI protocol, data in the "modified," "shared" or "exclusive" state, If an address points to an "invalid" datum (using the example of the MESI protocol again), it is not listed in the directory, and the processor wishing to access it must then query the non-cache memory.

Thus, the directories of proxy modules necessitate regular and frequent updates in order to add new addresses to them, such as when a processor needs read access to them. The size of the directories being limited, this update thus necessitates removing a previously stored address.

This deletion of an address in the directory is called "eviction." This operation can then be designated with the acronym "BINV" (back invalidation).

The eviction operation poses problems in more than one regard.

In particular, problems occur when the data manipulated are computer program instructions. When such programs are executed, the processors carry out preloading of instructions, or "prefetch." This involves loading an instruction whose execution has not yet been requested, but where the processor knows or guesses that the instruction will soon be called on.

Thus, if an eviction operation concerns an address pointing to a prefetched instruction, the processor is forced to wait until it is loaded again, which delays execution of the program (even though originally, prefetch was supposed to accelerate execution).

The eviction operation may also pose a problem when the address points to a datum and not an instruction.

SUMMARY

There is thus a need to reduce eviction operations in multiprocessor systems.

A first aspect of the invention is directed to a module of cache coherence management by directory in a multiprocessor system, in which each datum stored in cache memory is associated with one state among a plurality of states, at least one of which indicates data sharing among a plurality of processors, the module comprising:
- a storage unit to store a directory containing a list of cache memory addresses, each address possibly associated with one among a plurality of states corresponding to the state of the datum available at the address, and
- a processing unit configured to update the list, the processing unit being configured so as not to list in the list the address lines related to data associated with the first state indicating data sharing among a plurality of processors.

A module according to the first aspect enables multiprocessor systems to improve performance by appreciably reducing the number of eviction operations.

For example, the processing unit is configured to list only the addresses related to data associated with a state indicating the exclusivity of the data to the respective processors. In an embodiment, the processing unit executes machine or software instructions to carry out the above update. The machine or software instructions can be encoded in a memory or computer readable medium. The processing unit is a special purpose processing unit as it is programmed to carry out the above update. Moreover, the processing unit is a physical processing unit in that it includes or formed by hardware components for processing the machine or software instructions to carry out the above update.

In some embodiments, the processing unit is configured to operate selectively according to at least two modes:
- a first mode of operation in which the address lines associated with the the first state are not listed in the list, and
- a second mode of operation in which the address lines associated with the the first state are listed in the list.

The switching between the two modes can be carried out with machine or software instructions that, when executed by the processing unit, enable the processing unit to selectively operate in the first and second modes of operation.

For example, in the the first mode of operation, the only addresses stored are those related to data associated with a state indicating the exclusivity of the data to the respective processors.

A second aspect of the invention relates to a multiprocessor device comprising:
- a plurality of processors;
- a plurality of modules of cache memory respectively associated with the processors, and
- at least one proxy module according to the first aspect, configured to manage cache coherence among the cache coherence modules.

The multiprocessor device is a physical multiprocessor device. The plurality of processors are physical processors in that they include hardware components for carrying out their specific function(s).

A third aspect of the invention relates to a process of cache coherence management by directory in a multiprocessor system, in which each datum stored in cache memory is associated with one state among a plurality of states, at least a first state of which indicates data sharing among a plurality of processors, the process including:
- receiving a request relative to a datum in cache memory, determining the state of the datum,
- launching an update of a directory containing a list of cache memory addresses, each address possibly associated with one among a plurality of states corresponding to the state of the datum available at the address, if the determined state is at least a second state different from the first state, and
- launching a query of cache memory to obtain the datum if the determined state is at least the first state indicating data sharing among a plurality of processors, without update of the directory.

For example, the second state is a state indicating the exclusivity of the datum to a processor.

In some embodiments, the update is launched only if the second state is a state indicating the exclusivity of the datum to a processor. For example, the update includes a step of eviction of an address line from the directory.

In some embodiments, the process also contains a prior step of determination of a mode of operation to determine whether or not it is necessary to list in the list the address lines related to data associated with the first state indicating data sharing among a plurality of processors.

BRIEF DESCRIPTION OF THE DRAWINGS

Other characteristics and benefits of the invention will be seen by reading the following detailed description, provided as a non-restrictive example, and the attached figures in which:

FIG. 2 illustrates a directory according to various embodiments,

FIG. 3 illustrates a use of directory according to various embodiments, and

FIG. 4 schematically illustrates a proxy module according to various embodiments.

DETAILED DESCRIPTION

Figure 1:
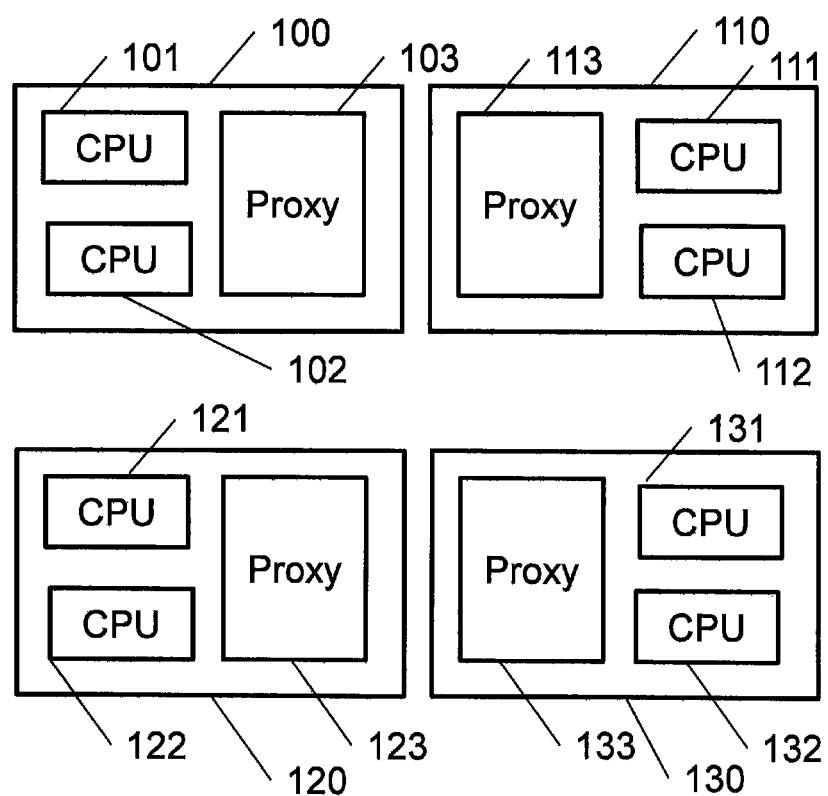
FIG. 1 schematically illustrates a multiprocessor system.

A system according to various embodiments may have the structure already presented in reference to FIG. 1. However, the structure and the management of the directory of the proxy modules differ as described below.

FIG. 2 illustrates a directory for the implementation of a cache memory coherence management according to various embodiments.

The directory 200 includes a plurality of lines 201 respectively associated with data stored in the system's cache memory.

Each line identifies a memory address 202 in which is stored a datum represented in the directory, a state 203 associated with the datum, and a list of processors 204, 205, 206, 207 which have recently requested access to the datum.

The address 202 may be more or less complete. In order to save memory space to store the directory, it is possible to envision storing only a portion of the memory address.

The state of the datum 203 is the state in which the datum is currently found. It may be found in a plurality of states. According to an embodiment of the invention, data in a state of sharing among several processors are not stored in the directory. Thus, the "shared" state does not appear in the directory. In addition, it is also possible that invalid data may not be represented in the directory. Thus, the "invalid" state might not appear in the directory. Other types of data may appear, such as, for example, the "exclusive" or "modified" states. In some embodiments, only the "exclusive" state is represented. The cache memory management protocol used may be of the type MESI, MOESI, MSI or other.

The list 204, 205, 206, 207 of processors having requested access to the datum may have more or less detail. Each processor may be identified by a single identifier. The identifier may also be accompanied by the state in which the processor has requested access to the datum. For example, the list of processors is classified in chronological order (or reverse chronological order) of the access requests, for example, from left to right (or the reverse). The oldest requests may be replaced by the most recent requests in order to store only a limited number of processors in this access history, and thus save memory space.

According to the prior art, in the directory would be found lines corresponding to shared data, while according to various embodiments of the invention, data in this state are absent from the directory. The system cache directory management modules in some embodiments are configured so as not to store such data in the directory.

A use of a directory for cache memory management is presented in reference to FIG. 3.

A processor 300 makes a request 301, for example in read mode, concerning a datum at the address adr0 in cache memory, in a given state STAT (for example, "shared" S, "exclusive" E or other). This request is sent to the proxy module 302.

The proxy module then checks whether the processing of this request is authorized (or possible) during a step 303. The proxy verifies, for example, that all resources necessary to the processing of the request are available, the directory being one resource in particular. However, the availability of other resources (transaction identifier or other) may be verified.

If the processing is not authorized (NOK), the proxy module may, for example, send the processor 300 a rejection message 304. However, other measures may be taken, such as waiting until all necessary resources are free.

Otherwise, the processing is authorized (OK), and during step 305 it is verified whether a new entry is necessary in the directory. In fact, only the transactions involving transition to a state managed by the directory necessitate an entry. For example, transactions that are purely invalidating (consisting of invalidating the data in all caches) do not need a directory entry. The datum finishes in state I (invalid) and the directory does not list data in this state.

Should it be determined that an entry is not necessary (NOK), the directory is then updated during a step 306 by adding the processor 300 to the list of processors having requested access to the datum. For example, the identifier of the processor 300 is added after the processors already listed. Alternatively, instead of adding the processor to the directory right away, it is possible to reserve the directory entry and wait for the datum to return before completely updating the directory.

The step 306 is thus executed when the memory address concerned is already present in the directory after its registration during the processing of a preceding request, during which it has been determined that an entry was necessary (OK) at the step 305.

Once step the 306 is executed, the normal read process is initiated during the step 307. For example, a read request is sent to the agent managing the memory (or the one representing the memory if it is necessary to go through a second proxy). The datum is then received in response. The process at the level of the agent managing the memory (access to the central memory, query of other caches or other) does not directly involve the issuer of the read (indirectly, conflict situations may be made visible to it).

Again in the step 305, should it be determined that an entry is not necessary (NOK), for example, because the datum requested is being shared (or in invalid state) and this type of datum is not represented in the directory, the step 306 is not implemented and we move to the step 307 of read. For example, a read request is sent to the agent managing the memory (or the one representing the memory if it is necessary to go through a second proxy). The datum is then received in response. It is then possible to pass directly to the step 307 of read. Alternatively, this step may be preceded by a query of all caches of the processors if, for example, the request asks for exclusivity on the datum (in this case, all copies of the datum must be invalidated).

If at the step 305 it is determined that a new entry is necessary for the datum at the address adr0 (OK), it is determined during a step 308 whether the address adr0 is already present in the directory.

In fact, if a transaction needs an entry in the directory but this entry already exists (OK), i.e., a preceding transaction at the same address has already initialized it, it reuses this entry and thus does not need to reallocate one.

Therefore, there is no eviction in this case.

The process then continues with the step 306 to update this state and continue reading. Otherwise (NOK), the address is not in the directory and during a step 309, it is verified whether there is a need to perform an eviction of an address already present in the directory.

If space is still available in the directory (NOK), eviction is not necessary and the process continues with the step 306 to add a line to the directory with the address concerned, the state of the datum and the identifier of the processor 300. Otherwise (OK), there is not enough space available and it is necessary to launch an eviction.

An address adr1 to be deleted is selected during the step 310. For example, a random address is selected. In another example, the oldest address ("least recently used") is selected. Other types of address may be selected. If no address can be selected, because they are all being used, the process may be put on hold until an address is freed. Alternatively, the process may issue a "retry" request to the issuer of the request.

A series of necessary verifications and allocations are then carried out following the operations during a step 311. In particular, it is verified that all resources necessary for processing the eviction are available.

The invalidation is then implemented during the step 312 by putting the datum at the address adr1 in the "invalid" state.

The read process then continues normally.

Assuming, for the purposes of illustration, that the directory used is according to prior art and that it stores shared data. Assuming that the datum at the address adr1 is a datum shared between the processor 300 and another processor 313. The proxy module then sends messages 314 and 315 to inform them of the new state of the datum.

It can be seen here that reading the datum at address adr0 has caused the invalidation of a datum at the address adr1 which was shared by several processors. This datum at address adr1 was, for example, an instruction prefetched by the processor 300 with a processor 313. When these processors try to access the instruction to execute it, they will not be able to do so and will have to relaunch an access. This increases the system latency and penalizes the speed of the system's execution of these instructions.

On the other hand, if the directory used is according to an embodiment of the invention, the above situation cannot occur, since the directory does not store shared data. The datum at address adr1 cannot be a shared datum. A datum may be in the "exclusive" or "modified" state, for example.

In the case of a directory according to an embodiment of the invention, only the message 314 is sent to the processor 300, which holds the datum. There is no reason to send the message 315.

A person skilled in the art would see a disadvantage in the fact that shared data are no longer represented in the directory as proposed. In fact, this involves systematically querying all of the system's cache memory when a processor wishes to access a shared datum.

However, the inventors have observed that this disadvantage is largely offset by the performance gains contributed by the elimination of evictions on shared data. For example, shared data are typically instructions, and as has already been mentioned, performing evictions on instructions greatly penalizes the system.

In addition, since shared data are no longer represented, it is possible, at constant directory size, to store a higher number of data in the other states. The directory size is thus virtually increased while saving on the surface occupied by the directory on the system's silicon.

In some embodiments, it is possible to store in the directory only the data in a state of exclusivity. This makes it possible to further reduce evictions.

In some embodiments, it is possible to plan for several modes of operation of the system. In one mode of operation, shared data are not represented in the directory. In another mode of operation, these data are listed.

It is possible to provide for switching selectively from one mode to the other, for example, based on the application in which the processor is used.

Thus, the decision to use a traditional inclusive directory (where the "shared" and "exclusive" states may be listed) or an inclusive directory in some embodiments (where, for example, only the "exclusive" state is listed) may be changed dynamically, for example, by a configuration register. This selective mode of operation permits choosing the mode most appropriate according to the application implemented. This also avoids the need to make a decision at the time of design of the management module, which would then be irrevocable.

FIG. 4 schematically illustrates a proxy module 40 according to various embodiments. It includes a physical memory 41 to store a cache memory management directory. It further includes a physical processing unit 42 to manage queries from the processors of a multiprocessor system according to a cache memory management by directory.

It will be appreciated by one skilled in the art that the disclosed arrangements and methods described herein represent a solution to the technological problem currently faced by designers to reduce eviction operations in multi-processor systems and to significantly increase the performances of those multiprocessor systems.

Having described and illustrated the principles of the invention with reference to various embodiments, it will be recognized that the various embodiments can be modified in arrangement and detail without departing from such principles. It should be understood that the devices, modules, processors, processing units, programs, processes, or methods described herein described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

Execution of the sequences of machine instructions contained in a memory causes the processor or processing unit to perform at least some of the process steps or function(s) of the procedures described herein. One or more physical processors or physical processing units in a multi-processing arrangement may also be employed to execute the sequences of instructions contained in the memory or machine/computer readable medium. In alternative embodiments, hard-wired circuitry may be used in place of or in combination with software instructions.

The term "computer readable medium" or "machine readable medium" or "machine storage medium" or "memory" as used herein refers to any medium that participates in providing instructions to a processor or processing unit for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer/machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer/machine readable media may be involved in carrying one or more sequences of one or more instructions to processor for execution.

Computer programs comprising machine executable instructions for implementing at least one of the steps of the method described herein or function(s) of various elements of the structural arrangement can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor or processing units so that the physical processor, in use, reads and executes the specific code instructions embedded in the non-transitory memory. The interface of the special purpose computer may be arranged in communication with the physical processor and receives input parameters that are processed by the physical processor.

This invention has been described and illustrated in this detailed description in reference to the attached figures. However, this invention is not limited to the forms of realization presented. By reading this description and the attached figures, a person skilled in the art may deduce and implement other variants and embodiments.

In the claims, the term "contain" does not exclude other elements or other steps. The use of the singular does not exclude the plural. A single processor or several other units may be used to implement the invention. The various characteristics presented and/or claimed may be combined beneficially. Their presence in the description or in the various dependent claims does not, in fact, exclude the possibility of combining them. Reference characters should not be construed to restrict the scope of the invention.

The invention claimed is:

1. A module of cache coherence management by directory in a multiprocessor system, in which each datum stored in cache memory is associated with one state among a plurality of states, at least a first state of which indicates data sharing among a plurality of processors of the multiprocessor system, the module comprising:
    a storage unit configured to store a directory containing a list of cache memory addresses, each address associated with one state among a plurality of states, said one state corresponding to the state of the datum available at the address, and
    a processing unit configured to update said list, said processing unit being configured so as not to list in said list address lines related to a first datum associated with the first state indicating data sharing among the plurality of processors notwithstanding the first datum being currently found in the first state and so as to list in said list address lines related to second datum associated with at least a second state different than the first state.

2. The Module according to claim 1, wherein the processing unit is configured to list only the addresses related to data associated with a state indicating an exclusivity of said data to the respective processors.

3. The module according to claim 1, wherein the processing unit is configured to operate selectively according to at least two modes:
    a first mode of operation in which the address lines associated with said first state are not listed in said list, and
    a second mode of operation in which the address lines associated with said first state are listed in said list.

4. The module according to claim 3, wherein in the first mode of operation, the only addresses stored are those related to data associated with a state indicating an exclusivity of said data to the respective processors.

5. A multiprocessor device comprising:
    a plurality of processors;
    a plurality of modules of cache memory respectively associated with said processors, and
    at least one proxy module according to claim 1, configured to manage cache coherence among said modules of cache memory.

6. A process of cache coherence management by directory in a multiprocessor system, in which each datum stored in cache memory is associated with one state among a plurality of states, at least a first state of which indicates data sharing among a plurality of processors, the process comprising:
    receiving a request relative to a datum in cache memory;
    determining a state of the datum;
    launching an update of a directory containing a list of cache memory addresses, each address associated with one state among a plurality of states corresponding to the state of the datum available at the address, if the determined state is at least a second state different from the first state, wherein the update comprises listing in said list an address line related to the datum; and
    launching a query of cache memory to obtain the datum, if said determined state is at least the first state indicating data sharing among the plurality of processors, without update of said directory that would otherwise list in said list the address line related to the datum.

7. The process according to claim 6, wherein the second state is a state indicating the exclusivity of the datum to a processor.

8. The process according to claim 7, wherein the update is launched only if the second state is a state indicating the exclusivity of the datum to a processor.

9. The process according to claim 6, wherein the launching of the update includes a step of eviction of an address line of the directory.

10. The process according to claim 6, further comprising:
    receiving a request relative to a datum in cache memory; and
    prior to the determination of the state of the datum, the launching of the update, and the launching of the query, determining a mode of operation to determine whether it is necessary to list in the list the address lines related to data associated with the first state indicating data sharing among a plurality of processors.

* * * * *

UNITED STATES PATENT AND TRADEMARK OFFICE
CERTIFICATE OF CORRECTION

PATENT NO. : 9,645,927 B2  
APPLICATION NO. : 14/744139  
DATED : May 9, 2017  
INVENTOR(S) : Thibaut Palfer-Sollier Page 1 of 1

It is certified that error appears in the above-identified patent and that said Letters Patent is hereby corrected as shown below:

On the Title Page

Item (30) Foreign Application Priority Data is missing and should read as follows:
(30) Foreign Application Priority Data
June 20, 2014 (FR)........................1455746

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*